US006805329B2

(12) United States Patent
Kegel

(10) Patent No.: US 6,805,329 B2
(45) Date of Patent: Oct. 19, 2004

(54) VALVE FOR CONTROLLING FLUIDS

(75) Inventor: Timo Kegel, Bamberg (DE)

(73) Assignee: Robert Bosch GmbH, Stuttgart (DE)

( * ) Notice: Subject to any disclaimer, the term of this patent is extended or adjusted under 35 U.S.C. 154(b) by 7 days.

(21) Appl. No.: 10/241,508

(22) Filed: Sep. 12, 2002

(65) Prior Publication Data

US 2003/0127617 A1 Jul. 10, 2003

(30) Foreign Application Priority Data

Sep. 15, 2001 (DE) ........................................ 101 45 620

(51) Int. Cl.[7] ................................................ F16K 31/02
(52) U.S. Cl. .................. 251/57; 251/129.06; 239/102.2
(58) Field of Search .............................. 251/129.06, 57; 239/102.2, 102.1, 533.7; 60/545

(56) References Cited

U.S. PATENT DOCUMENTS 4,560,871 A * 12/1985 Bowman et al. .............. 251/57
4,852,606 A * 8/1989 Heneker ...................... 251/57
4,971,290 A * 11/1990 Dahlmann ............. 251/129.06
5,697,554 A * 12/1997 Auwaerter et al. ......... 239/584
6,062,533 A * 5/2000 Kappel et al. ................ 251/57
6,178,996 B1 * 1/2001 Suzuki ........................ 251/57
6,457,699 B1 * 10/2002 Stoecklein ............. 251/129.06
6,651,950 B2 * 11/2003 Stoecklein et al. ........... 251/57

FOREIGN PATENT DOCUMENTS

DE 100 19 767 A1 * 10/2001

* cited by examiner

*Primary Examiner*—John Bastianelli
(74) *Attorney, Agent, or Firm*—Ronald E. Greigg

(57) ABSTRACT

A valve for controlling fluids for reservoir injection systems, includes a hydraulic coupler and a piezoelectric actuator. The hydraulic coupler includes a first piston, a second piston, and a coupler chamber disposed between the two pistons. The piezoelectric actuator is in communication with the first piston. The first piston is embodied as substantially cup-shaped, and the second piston is disposed in a recess in the first piston. The coupler chamber is disposed between the second piston and an inner bottom region of the first piston. As a result, a hydraulic coupler of compact design can be furnished without reversing the direction of motion of the two pistons.

13 Claims, 2 Drawing Sheets

VALVE FOR CONTROLLING FLUIDS

BACKGROUND OF THE INVENTION

1. Field of the Invention

The present invention relates to a valve for controlling fluids for a reservoir injection system, such as a Diesel or gasoline injection valve.

2. Description of the Prior Art

Various versions of fuel injection valves are known. Most recently, such fuel injection valves have been actuated by a piezoelectric actuator, which controls a motion of a nozzle needle for injecting fuel. With such piezoelectric actuators, very short switching times can be achieved in particular. However, the piezoelectric actuators have the disadvantage that they have changes in length upon changes in temperature, such as an increase in temperature in the engine compartment while an engine is in operation. Moreover, the stroke of the piezoelectric actuators is relatively short. So-called hydraulic boosters are therefore used to boost the stroke of the piezoelectric actuator. The hydraulic boosters simultaneously have the advantage of being capable of compensating for temperature-caused changes in length of the piezoelectric actuator, by reducing the volume in the booster chamber. Typically, hydraulic boosters are embodied in such a way that they have a first piston, a second piston, and a booster chamber disposed between the two pistons. One of the two pistons communicates with the piezoelectric actuator, and the boosting depends on the selected ratio between the diameters of the two pistons. Since the first piston, the booster chamber, and the second piston are disposed in line, the known hydraulic booster has a relatively great structural height.

In German Patent Disclosure DE 199 39 452 A1, a hydraulic booster has therefore been proposed in which a first piston is embodied with a cylindrical bore in which the second piston is disposed. The booster chamber is disposed below the first piston, and the second piston is embodied as a stepped piston, so that an annular underside of the second piston is in communication with the booster chamber. Because the second piston is disposed partly in the first piston, the axial structural length of the hydraulic booster is indeed reduced, but because of their special disposition, the two pistons have different directions of motion; that is, the first piston is moved downward by a piezoelectric actuator, while the second piston is moved upward in the first piston. As a result, this booster can be used only for inward-opening valves, since the valve member that is connected to the second piston has the same direction of motion as the second piston.

OBJECT AND SUMMARY OF THE INVENTION

The valve for controlling fluids of the invention has the advantage over the prior art that it has a hydraulic coupler, in which no reversal of direction of the two pistons occurs; the piston has an especially short length in the axial direction of the valve. In other words, the two pistons of the coupler move in the same direction, making it possible for the coupler to be used in an outward-opening valve. The coupler of the invention can thus be constructed quite compactly and requires only little installation space. Moreover, savings of material can be attained with the coupler of the invention, so that the weight of the coupler in particular is reduced. To that end, the hydraulic coupler of the invention is constructed such that a first piston is embodied as substantially cup-shaped, so that it has both a recess and an inner bottom region. A second piston is disposed in the recess of the first piston, and the coupler chamber, which is filled with a fluid, is disposed between the second piston and the inner bottom region of the first piston. As a result, the hydraulic coupler of the invention can have minimal dimensions in the longitudinal direction of the coupler. It should be noted that a substantially cup-shaped piston is understood to mean a piston that has a bottom region and a wall region encompassing the outer edge of the bottom region. The first piston can for instance have a circular, oval, square, rectangular, or polygonal outer circumference, or some other arbitrary outer circumferential shape. The recess formed by the wall regions of the substantially cup-shaped piston can also have a circular, oval, square, rectangular, or polygonal circumference, or some arbitrary other circumferential shape.

In a preferred version of the present invention, the second piston has a piston face which is the same size as the area of the inner bottom region of the first piston. As a result, it is attained that the hydraulic coupler does not execute any boost in the stroke of the piezoelectric actuator but instead merely compensates for temperature-caused changes in length of the piezoelectric actuator. There is a need for such a hydraulic coupler without a booster function, especially in fuel injection valves with very close tolerances of their structural parts, to avoid magnifying the tolerances.

In another preferred version of the present invention, the piston face of the second piston is smaller in area than the inner bottom region of the first piston. As a result, the hydraulic coupler functions as a booster for boosting the stroke of the piezoelectric actuator. A boost in the actuator stroke is effected as a function of the ratios of the area of the second piston to the area of the inner bottom region of the first piston.

According to the invention, the second piston is guided directly or indirectly in the first piston.

Preferably, a guide element is disposed in the recess of the first piston, for guiding the first piston and the second piston. If the guide element is embodied such that it does not extend as far as the bottom region of the first piston, it is simple to furnish a hydraulic coupler that has a booster function.

Advantageously, the second piston is embodied as a structural unit with a nozzle needle of the valve for controlling fluids. The second piston can either be embodied integrally with the nozzle needle or connected rigidly to the nozzle needle by means of laser welding or screw fastening. In this version, it is possible in particular to dispense with a needle guide for the nozzle needle, since the needle connected rigidly to the second piston is guided by the guide of the piston itself.

In another preferred version of the present invention, the second piston rests directly or indirectly on the nozzle needle. In other words, the second piston and the nozzle needle are not embodied as a structural unit but instead as two separate parts. As a result, it is possible in particular to prevent a recoil, which can occur for instance upon closure of the nozzle needle because of the high pressures and the fast switching times, from being transmitted. Moreover, simple fastening of a needle guide on the nozzle needle is possible.

Preferably, the second piston is likewise embodied as substantially cup-shaped. In particular, the recess of the second piston can be used as a spring seat for a nozzle spring for closing the nozzle needle, if the second piston is embodied as a structural unit with the nozzle needle.

Preferably, a closing spring for the nozzle needle is braced on the second piston. As a result, the number of components can be kept quite low.

Advantageously, a disk or a ring for bracing a restoring spring for the coupler is disposed on the second piston. The restoring spring preferably engages peripheral regions of the first piston, so that after the valve actuation has ended, the coupler can be restored to its outset position.

To make it especially inexpensive and simple to produce, the guide element disposed in the recess of the first piston is preferably embodied as a cylindrical bush. Moreover, the first piston and the second piston preferably also have circular circumferences.

The valve for controlling fluids of the invention is preferably used as a fuel injection valve in common rail or reservoir injection systems, for both Diesel injectors and gasoline injectors.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
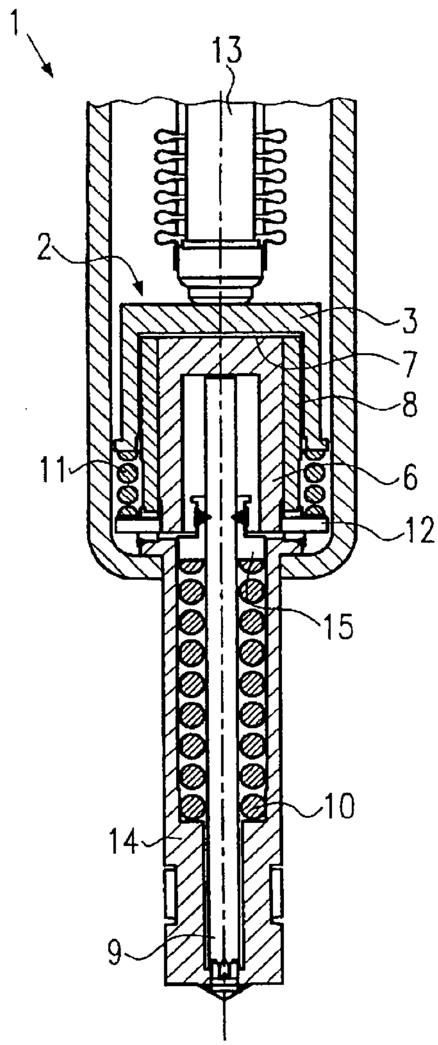
FIG. 1 shows a schematic sectional view of a valve for controlling fluids, in a first exemplary embodiment of the present invention.
Figure 2:
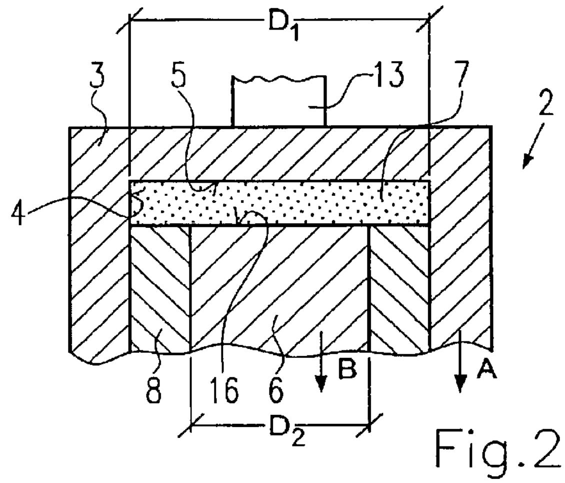
FIG. 2 shows an enlarged partial sectional view of a coupler used in FIG. 1.
Figure 3:
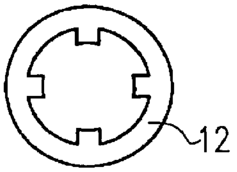
FIG. 3 is a plan view on a disk used for bracing the restoring spring of the coupler.

In FIGS. 1–3, a valve 1 for controlling fluids, in a first exemplary embodiment of the present invention, is shown in which the valve 1 includes a piezoelectric actuator 13, a hydraulic coupler 2, and a nozzle needle 9. The individual components of the valve 1 are disposed in a multi-part housing 14. As seen particularly from FIG. 2, the hydraulic coupler 2 includes a cup-shaped first piston 3, a second piston 6, and a fluid-filled coupler chamber 7. The cup-shaped first piston 3 has a cylindrical recess 4 with a bottom region 5. The coupler chamber 7 is disposed in the interior of the first piston 3, between the bottom region 5 and a piston face 16 of the second piston 6 (see FIG. 2). A rigid guide element 8 is also disposed and retained in the recess 4 of the first piston 3, for guiding the first and second pistons. As can be seen from FIG. 2, the guide element 8 is embodied as a bush. A disk 12 is disposed below the guide element 8 and is secured to the second piston 6. The disk 12 is shown in detail in FIG. 3.

As shown particularly in FIG. 1, the disk 12 also serves to brace a coupling spring 11, which keeps the hydraulic coupler 2 in a predetermined outset position, and which after the end of the injection of fuel restores the hydraulic coupler to its outset position again. The spring 11 is braced on one end on the disk 12 and on the other on the bush like wall region of the first piston 3 (see FIG. 1).

The valve 1 of the first exemplary embodiment moreover has a nozzle spring 10, which returns the nozzle needle 9 again after actuation. To that end, a needle guide 15 is provided on the nozzle needle 9 and can be joined to the nozzle needle 9 by means of welding, for instance.

The function of the valve 1 of the first exemplary embodiment will now be described. If the piezoelectric actuator 13 is triggered, the resultant stroke of the piezoelectric actuator is transmitted to the first piston 3, which moves downward in the direction of the arrow A (see FIG. 2). This stroke is transmitted to the fluid located in the coupler chamber 7, via the bottom region 5 of the first piston 3, and from there is transmitted onward to the piston face 16 of the second piston 6. Since a diameter $D_1$ of the bottom region 5 of the first piston 3 is greater than a diameter $D_2$ of the piston face 16 of the second piston 6, a boost of the piezoelectric actuator stroke is effected, in accordance with the ratio of the two diameters to one another, that is, $D_1/D_2$. The second piston 6 as a result likewise moves in the same direction as the first piston, in the direction of the arrow B (see FIG. 2). Since the second piston 6 is connected directly to the nozzle needle 9, which is disposed in a recess formed in the second piston 6, the stroke is transmitted to the nozzle needle 9, which therefore lifts from its seat, so that an injection of fuel into a combustion chamber, not shown, can occur. In this process, the nozzle needle 9 moves outward, beginning at the valve 1.

If an injection is to be terminated, the piezoelectric actuator 13 is triggered again, thus reversing the change in length of the piezoelectric actuator, and the nozzle needle 9, because of the force of the nozzle spring 10, is moved upward again onto its seat, and the injection is terminated. Simultaneously, the coupler spring 11 returns the hydraulic coupler 2 to its outset position.

Since both the first piston 3 and the second piston 6 have the same direction of motion, it is possible for the valve 1 to be embodied as an outward-opening valve, in which the nozzle needle 9 is moved in the same direction as the two pistons 3, 6 for opening. In that case, the axial dimension of the valve 1 can be reduced markedly in comparison with the prior art, since both the coupler chamber 7 and the second piston 6 are disposed in the recess 4 of the first piston. As a result, an especially compact, low-weight valve 1 can be furnished.

Figure 4:
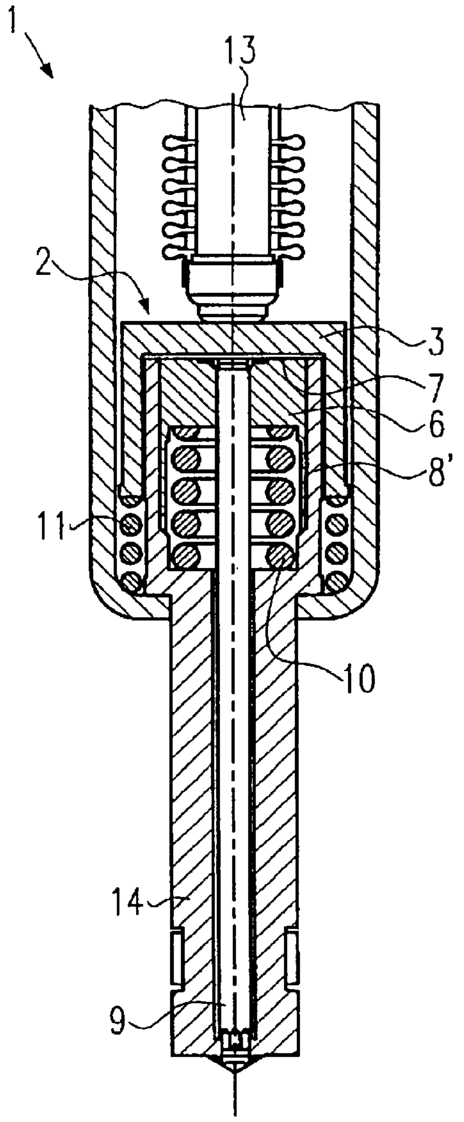
FIG. 4 shows a schematic sectional view of a valve for controlling fluids in a second exemplary embodiment of the present invention.

A valve in accordance with a second exemplary embodiment of the present invention will now be described, referring to FIG. 4. Elements that are the same or functionally the same are identified by the same reference numerals as in the first exemplary embodiment.

In a distinction from the first exemplary embodiment, in the second exemplary embodiment the piston 6 and the nozzle needle 9 are provided as a common structural unit. To that end, the nozzle needle 9 is joined to the piston 6 by means of welding. To that end, a through bore is provided in the piston 6, so that the nozzle needle 9 can be welded to the piston face of the piston 6 facing toward the coupler chamber (see FIG. 4). Moreover, the second piston 6 is likewise embodied as cup-shaped, and as a result it furnishes a spring seat for the nozzle spring 10. A restoration of the nozzle needle 9 is thus effected via the second piston 6. As shown in FIG. 4, the nozzle spring 10 is braced on its other end on the housing 14. Also, the region of the housing 14 that has the nozzle needle 9 is embodied in such a way that it simultaneously furnishes the guide element for the first and second pistons 3, 6. In FIG. 4, this bush like extension of the housing 14 is identified by reference numeral 8'. Otherwise, the valve in the second exemplary embodiment is essentially equivalent to that in the first exemplary embodiment, so that the description of the latter can be referred to.

Figure 5:
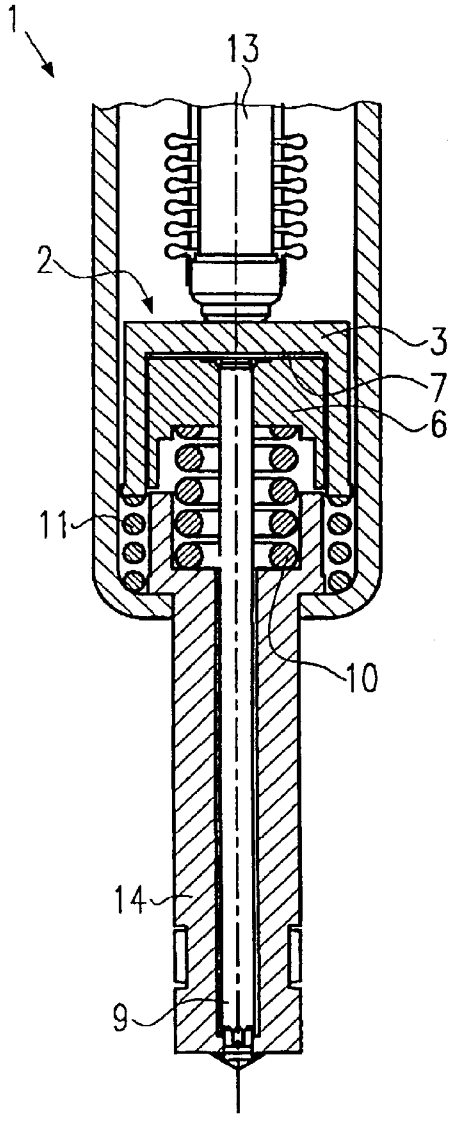
FIG. 5 shows a schematic sectional view of a valve for controlling fluids in a third exemplary embodiment of the present invention.

In FIG. 5, a valve for controlling fluids is shown in a third exemplary embodiment of the present invention. Once again, elements that are the same or functionally the same are identified by the same reference numerals as in the first exemplary embodiment.

In contrast to the two exemplary embodiments described above, the hydraulic coupler 2 in the third exemplary embodiment does not furnish any boost of the stroke of the piezoelectric actuator 13. This is achieved by providing that the diameter of the second piston 6 is equivalent to the diameter of the recess made in the first piston 3. It is thus possible to prevent a disadvantageous boosting and adding up of production-dictated tolerances of the components caused by the hydraulic coupler. Otherwise, the valve in the third exemplary embodiment is essentially equivalent to the second exemplary embodiment, so that the description thereof can be referred to.

Thus the present invention relates to a valve 1 for controlling fluids for reservoir injection systems, including a hydraulic coupler 2 and a piezoelectric actuator 13. The hydraulic coupler 2 includes a first piston 3, a second piston 6, and a coupler chamber 7 disposed between the two pistons. The piezoelectric actuator 13 is in communication with the first piston 3. The first piston 3 is embodied as substantially cup-shaped, and the second piston 6 is disposed in a recess 4 in the first piston 3. The coupler chamber 7 is disposed between the second piston 6 and an inner bottom region 5 of the first piston 3. As a result, a hydraulic coupler of compact design can be furnished without reversing the direction of motion of the two pistons.

The above description of the exemplary embodiments of the present invention is intended solely for illustrative purposes and not for the sake of limiting the invention. Within the scope of the invention, various changes and modifications can be made without departing from the scope of the invention or its equivalents.

The foregoing relates to preferred exemplary embodiments of the invention, it being understood that other variants and embodiments thereof are possible within the spirit and scope of the invention, the latter being defined by the appended claims.

I claim:

1. In a valve for controlling fluids for a reservoir injection system, including a hydraulic coupler (2) with a first piston (3), a second piston (6), and a fluid-filled coupler chamber (7) disposed between the two pistons, a piezoelectric actuator (13), which is in communication with the first piston (3), the improvement wherein the first piston (3) is embodied as substantially cup-shaped and has a recess (4) and an inner bottom region (5); the second piston (6) is disposed in the recess (4) in the first piston (3); the coupler chamber (7) is disposed between the second piston (6) and the inner bottom region (5) of the first piston (3); and a rigid guide element (8; 8') disposed in the recess (4) of the first piston (3), for guiding the second piston (6) in the recess of the first piston (3).

2. The valve of claim 1 wherein the piston face (16) of the second piston (6) is smaller in area than the inner bottom region (5) of the first piston (3).

3. The valve of claim 1 wherein the second piston (6) is embodied as a structural unit with a nozzle needle (9) of the valve.

4. The valve of claim 2 wherein the second piston (6) is embodied as a structural unit with a nozzle needle (9) of the valve.

5. The valve of claim 1 wherein the second piston (6) rests directly or indirectly on a nozzle needle (9) of the valve.

6. The valve of claim 2 wherein the second piston (6) rests directly or indirectly on a nozzle needle (9) of the valve.

7. The valve of claim 1 wherein the second piston (6) is likewise embodied as substantially cup-shaped.

8. The valve of claim 2 wherein the second piston (6) is likewise embodied as substantially cup-shaped.

9. The valve of claim 7 further comprising a closing spring (10) for a nozzle needle (9) of the valve braced on the second piston (6).

10. The valve of claim 1 further comprising a restoring spring (11) braced on a disk (12) for restoring the hydraulic coupler (2).

11. The valve of claim 2 further comprising a restoring spring (11) braced on a disk (12) for restoring the hydraulic coupler (2).

12. The valve of claim 1 wherein the guide element (8) is embodied as a cylindrical bush.

13. The valve of claim 1 wherein the guide element (8) is embodied as a bushlike extension (8') on a housing (14) of the valve.

* * * * *